Figure 1:
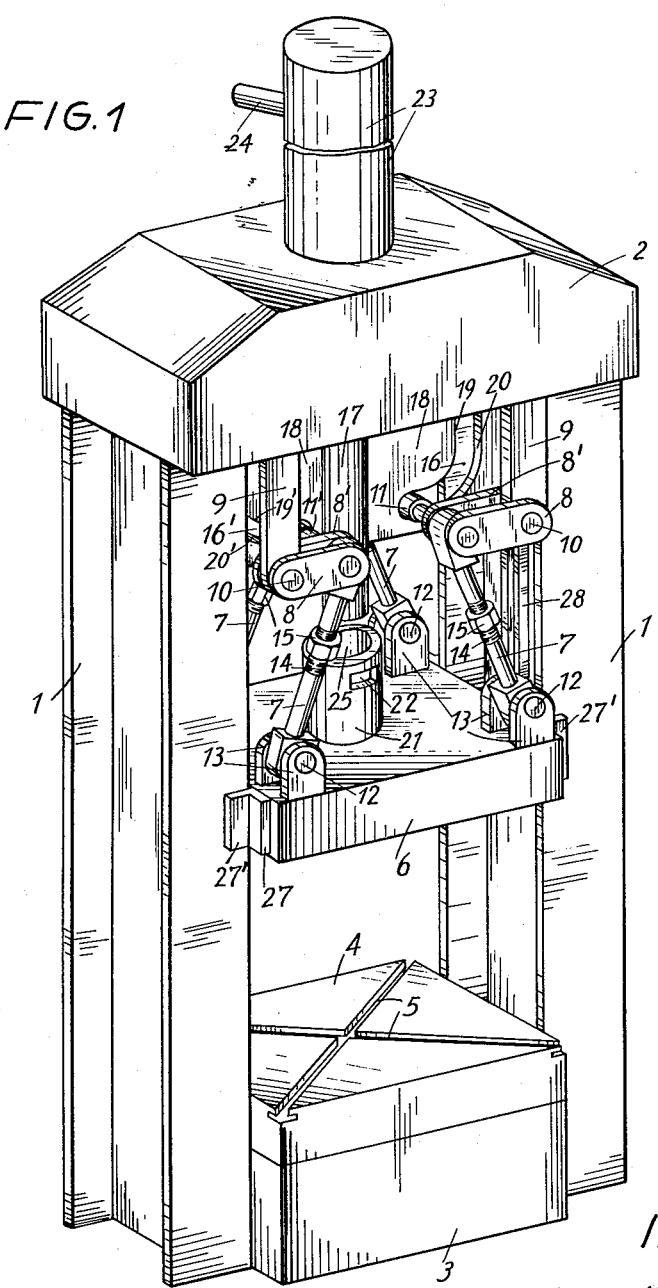

Jan. 9, 1962 H. HÖLLFRITSCH 3,015,848
JET MOLDING MACHINES
Filed Aug. 25, 1960 2 Sheets-Sheet 1

INVENTOR:
HANS HÖLLFRITSCH
By: George H Spencer
Attorney

Jan. 9, 1962 H. HÖLLFRITSCH 3,015,848
JET MOLDING MACHINES
Filed Aug. 25, 1960 2 Sheets-Sheet 2

INVENTOR:
HANS HÖLLFRITSCH
By: George U Spencer
Attorney

United States Patent Office 3,015,848
Patented Jan. 9, 1962

3,015,848
JET MOLDING MACHINES
Hans Höllfritsch, Eslarn, Oberpfalz, Bavaria, Germany
Filed Aug. 25, 1960, Ser. No. 51,858
Claims priority, application Germany Aug. 27, 1959
9 Claims. (Cl. 18—30)

This invention relates to a jet molding machine comprising at least one toggle joint system serving to exert the closing pressure on the mold, and for controlling the opening or closing movement respectively of the mold or parts of the mold. In this the toggle joint system is acting on one of the movable mold supporting plates. The length of the push rod of the toggle joint system being dimensioned in such a way that the closed position of both mold halves mounted on the mold supporting plates is attached when the stretched or dead point position the toggle joint system is reached.

In known machines of the aforementioned type the locking elements for the mold halves formed by the toggle joint system and the injecting piston are disposed on opposite sides of the mold. Thus the directions of force as well as the direction of movement of the toggle joint systems in closing the mold, and the direction of force and movement of the molding piston when injecting the material into the mold are opposed to each other. This arrangement and mode of operation is afflicted with the following drawbacks.

If it was intended to operate these known jet molding machines fully automatically, which means that the amount of pressure, the time of pressure, the velocity of pressure and in the first place the feeding of the material into the injecting cylinder had to be controlled according to a certain program, it was not possible to construct this machine as a so called "down" press, as in this case the dosing device attached to the injecting cylinder had to be disposed on top of the mold in order to obtain a natural fall for the material, and consequently the driving force for the closing movement of the mold supporting plates had to be directed upwardly or horizontally. Therefore the known jet molding machines were constructed as "upward" presses or "lateral" presses, which afforded an extremely high driving capacity, particularly so, when larger molds were used which as is well known require especially high closing pressures. Furthermore, the arrangement of two driving systems, i.e. one for the injecting piston and the other one for the closing movement of the mold, involves a considerable increase in cost.

The invention provides a jet molding machine which is simple in construction and which above all requires relatively little driving energy only. This is substantially achieved by the fact, that the movement and the force of the toggle joint system in opening or closing the mold is unidirectional with the movement and force of the injecting piston, and that the toggle joint is exclusively actuated by the injection piston.

Contrary to the known jet molding presses the injecting piston and the locking elements for the mold, i.e. the toggle joint systems are, according to the invention, arranged on the same side of the mold. Furthermore, merely one source of power is provided for locking the mold and actuating the injecting piston which, according to the invention is attained in that the toggle joint system is actuated by the injecting piston. Above all the invention makes it possible to also construct the machine as a "down" press for fully automatic operation. Thereby a considerable amount of energy is saved in operating the machine.

According to the invention the cooperation of the toggle joint system or systems respectively with the injecting piston is such that the latter may still be moved beyond the closing position of the mold, i.e. beyond the dead center position (stretched position) of the toggle joint system. In this stage of the working cycle of the machine the required pretensioning for exerting the closing pressure of the mold and the pressure of the entire mold against the injection nozzle is attained due to the dead center position of the toggle joint system, and further movement of the injecting piston effects the necessary injecting pressure.

According to particular feature of the invention the movement control of the toggle joint system is obtained in that the injecting piston is provided with a cam plate comprising guiding surfaces for the pivot pin connecting the two levers of each joint. Preferably the pin is guided in a curve machined into the path. The form of the curved slot must be adapted to the plate of movement which the pivot pin describes when stretching or collapsing the toggle joint levers. Furthermore, in determining the form of the curved slot it should be considered that the motion of the injecting piston is to be continued after the toggle joint system has attained the dead center position, and that in this continued motion also the cam plate is moved. Therefore the curved slot is arcuately shaped in its lower zone directed toward the piston. Upwardly the curve extends in parallel to the piston the length of this straight part corresponding at least to the working stroke of the injecting piston for injecting the material into the mold.

If larger molds are used the invention provides that four toggle joint systems are acting on the movable mold supporting plate. These are coupled pairlike by a common pivot pin which is cooperating with the guiding surfaces formed by the curved slot in said cam plate. If in this case one cam plate is used, it will be disposed normally to the axis of the two pivot pins and will be provided with two curved slots formed in the above mentioned manner which will be arranged on either side of the injecting piston. Obviously there may also be provided more than four toggle joint systems.

For guiding the cam plate and the injecting piston connected therewith in the machine frame, the outer lateral edges of the cam plate may be guided in rails provided on the frame of the machine. Preferably the injecting piston is operated hydraulically. This has the advantage that the driving forces are readily measurable and are adjustable as are the speeds of movement and may be readily adapted to the prevailing requirements.

In order that the throat, i.e. the distance between the lower stationary mold supporting plate and the upper mold supporting plate in its upper working position, may be adjusted corresponding to the height of the mold being used to push rods of the toggle joint systems are provided with adjusting means, e.g. threaded spindles with locking nuts.

Now the invention shall be described by way of example only in connection with one embodiment of the machine shown in the drawing.

Figure 2:
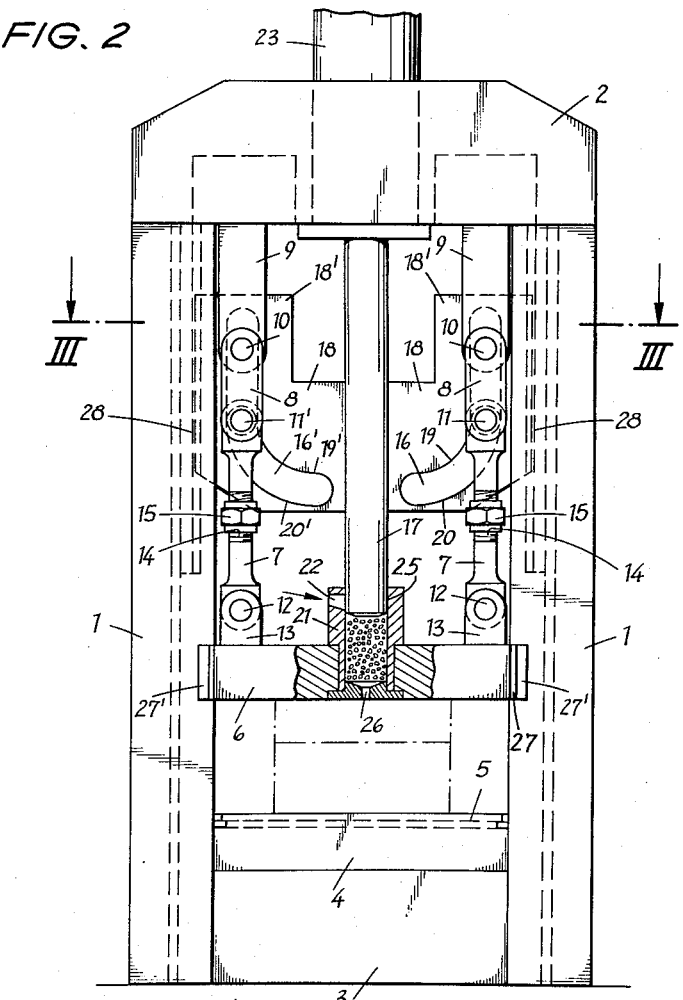
Figure 3:
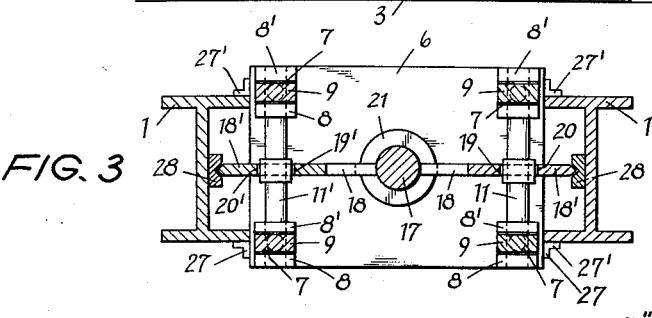

FIG. 1 shows a perspective view of the machine,
FIG. 2 shows a longitudinal sectional view of the machine illustrated in FIG. 1, and
FIG. 3 shows a sectional view along the line III—III of FIG. 2.

The frame of the machine is formed by the two side columns 1 and the yoke 2 connecting them at the top. Between the lower ends of the side columns the working table 3 is arranged, on which the lower stationary mold supporting plate 4 is supported, which is provided with T-slots 5 for clamping the lower half of the mold, which is only shown in FIG. 2. The upper mold supporting plate 6 is movable and opposes the lower mold supporting plate 4 and is suspended on four toggle joint systems. Substantially these are each formed by a push rod 7 and two lever links 8, 8'. The toggle joint systems are mounted on members 9 which are fixedly connected with the yoke 2. For this purpose the lever links 8, 8' and the member 9 are each connected by a pivot pin 10. The connection between the push rod 7 and the lever links 8,8' is accomplished by the pivot pin 11, 11', by which the two toggle joint systems arranged at the right and the left hand side in the machine frame are drivingly connected together. The lower ends of the push rods 7 are each connected with ears 13 provided on the upper mold supporting plate 6 by means of pivot pins 12. The push rods are adjustable in length allowing adjustment to the height of the mold. For this purpose the push rods are provided with threaded ends 14 engaging adjustment nuts 15.

The two pivot pins 11, 11' are guided in the curved slots 16, 16' which are machined into the plate 18 which is mounted on the injecting piston 17. The curved slots 16, 16' extend, as may be seen in FIGS. 1 and 2, in their lower zone arcuately directed toward the injecting piston 17 and upwardly in parallel to the injecting piston forming a straight stretch 18'. The contours 19, 20 or 19', 20' respectively of the curved slots 16, 16' are forming the guide surfaces for the two pivot pins 11, 11'.

The injection cylinder 21 is connected with the upper mold supporting plate 6 for example by inserting it into an opening provided in the upper mold supporting plate 6 (see FIG. 2). The wall of the injection cylinder is provided with an aperture 22 serving as an inlet for feeding the material into the cylinder which is coming from a dosing device. The cylinder 21 may be heated to the required temperature of the material to be injected, preferably plastic material by means of a heating device which is not illustrated.

Above the yoke 2 a hydraulic cylinder 23 is arranged for driving the machine. Pressure fluid is fed into the cylinder via the duct 24.

Followingly the mode of operation of the above described machine shall be described.

At the beginning of the working cycle the upper mold supporting plate 6 and the injecting piston 17 are in their uppermost working position, as may be seen in FIG. 1. In this position the mold halves, which are mounted on the lower mold supporting plate 4 and on the upper mold supporting plate 6 respectively, are opened. The toggle joint systems are collapsed in this position. During the stage of the operating cycle the material, e.g. plastic material granulate is fed into the injecting cylinder either through the face opening 25, or the opening 22 within the wall of the cylinder.

If the hydraulic cylinder 23, which is actuating the injecting piston 17 is pressurized the piston is lowered, whereby the cam plate 18 being fixedly connected with the piston is taken along. Due to the guidance of the two pivot pins 11, 11' in the curved slots 16, 16' the stretching of the toggle joint system is initiated. If the pivot pins during the downward motion of the injecting piston 17 get into the straight section of the curved slot 16, 16' the toggle joint systems are moved into their dead center positions i.e. they are stretched. In this moment the closed position of the two mold halves is obtained, the mold halves being effectively locked together by the stretched toggle joint systems. At the same time the mold as a whole is hereby pressed with the required pressure against the injecting nozzle 26 in the upper mold supporting plate (see FIG. 2). During the aforementioned closing movement of the mold the upper mold supporting plate 6 is guided by the angle iron 27 the one leg 27' of which contacting the outside of the columns 1. The cam plate 18 and at the same time the injecting piston 17 are guided by rails 28 provided on the walls of the columns 1, into which rails the lateral edges of the cam plate 18 extend.

After the closing position of the mold has been obtained the movement of the injecting piston 17 is continued and the piston is entering the injecting cylinder 21, whereby the working stroke for the injection process is initiated. In this moment the feed of material into the cylinder 21 is interrupted. Continued movement of the injecting piston 17 is possible due to the fact that the curved slots 16, 16' in plate 18 are extending upwardly in straight and parallel relation to the axis of the piston above the curved section. During the aforementioned working stroke of the injecting piston for the injecting process the pivot pins 11, 11' of the toggle joint systems are moving along these straight stretches of the curved slots. This is also illustrated in FIG. 2, in which the toggle joint systems are shown in the dead center position and the piston 17 is entering the cylinder 21.

The downward movement of the injecting piston 17 may be continued until the pivot pins 11, 11' of the toggle joint systems will abut against the upper ends of the curved slots 16, 16' in which moment the lowermost position of the injecting piston 17 would have been obtained. After the injecting process is completed the injecting piston 17 is moved upwardly again. During the motion the mold remains closed however, until the pivot pins 11, 11' enter the curved portion of the curved slots 16, 16' of the plate 18, which is lifted together with the piston 17. Only after this partial movement of the total stroke the disengagement of the mold is initiated, so that upon continued upward movement of the piston 17 the parts of the mold which are mounted on the mold supporting plates 4, 6 will be separated from each other. In the uppermost working position the finished molded work piece may be removed out of the mold. Hereafter the described steps of the working cycle are repeated which may be controlled in a fully automatical manner.

The machine may be used in a vertical as well as a horizontal position.

What I claim is:

1. A jet molding machine, comprising a machine frame formed by side columns connected by a working platform at one end and by a yoke at the other end; a first supporting plate for mold means, said supporting plate being fixedly arranged on said working platform; a reciprocating second supporting plate for mold means, said second supporting plate being suspended on at least one toggle joint system comprising one pair of toggle joint levers arranged on either side of said second mold supporting plate; an injecting cylinder having an injection nozzle and being mounted on said second mold supporting plate; a power operated injecting piston the movement and force of which being unidirectional with that of said toggle joint system; actuating means mounted on said injecting piston comprising cam means providing guiding surfaces for the pivot pins forming the collapsible joint of said toggle system, said guiding surfaces of said cam means being shaped so as to collapse said toggle joint levers upon moving said injecting piston away from said first mold supporting plate, and to move said toggle joint levers into their dead center position, if it is moved in the opposite direction for locking said mold means and pressing said injection nozzle against said mold means, the shape of said guiding surfaces allowing continued movement of said injecting piston with said cam means toward said second mold supporting plate and into said injecting cylinder beyond the dead center position of said toggle joint levers.

2. A jet molding machine according to claim 1, in which said cam means are formed by a plate rigidly connected with said injecting piston, said plates having slots provided therein extending toward said mold supporting plates in spaced parallel relation to said injecting piston on the end remote from said mold supporting plate and convergingly toward said injecting piston on the end facing said injection piston, said pivot pins forming the collapsible joint of said toggle system extending through said slots.

3. A jet molding machine according to claim 1, in which said cam means are formed by a plate rigidly connected with said injecting piston, guide means being provided on said slide columns engaging the lateral edges of said plate.

4. A jet molding machine, comprising a machine frame formed by side columns connected by a working platform at one end and by a yoke at the other end; a first supporting plate for mold means, said supporting plate being fixedly arranged on said working platform; a reciprocating second supporting plate for mold means, said second supporting plate being suspended on at least four toggle joint levers two of them being arranged on either side of said second supporting plate; an injecting cylinder having an injection nozzle and being mounted on said second mold supporting plate; a power operated injecting piston the movement and force of which being unidirectional with that of said toggle joint levers; actuating means mounted on said injecting piston comprising cam means providing guiding surfaces on either side of said injecting piston for two pivot pins each of which forming the collapsible joint of two toggle joint levers, said guiding surfaces of said cam means being shaped so as to collapse said toggle joint levers upon moving said injecting piston away from said first mold supporting plate, and to move said toggle joint levers into their dead center position, if it is moved in the opposite direction for locking said mold means and pressing said injection nozzle against said mold means, the shape of said guiding surfaces allowing continued movement of said injecting piston with said cam means toward said second mold supporting plate and into said injecting cylinder beyond the dead center position of said toggle joint levers.

5. A jet molding machine according to claim 4, in which the working stroke of said injecting piston is vertically downwardly directed.

6. A jet molding machine according to claim 4, in which said injecting piston is formed by the free end of a piston rod connected to a piston slidably arranged within a hydraulically pressurized cylinder which is mounted on said yoke of the machine frame.

7. A jet molding machine according to claim 4, in which the toggle joint levers pivotally connecting said second mold support plate with said pivot pin are provided with means for adjusting the length of said levers.

8. A molding machine, comprising, in combination: a mold having a movable part; an injecting plunger for introducing a molding medium through said mold part and into the mold; a toggle system for opening and closing the mold and for applying closing pressure by moving the movable mold part, said system including a plate having a slot formed therein which has a straight portion merging into an arcuate portion, said plate being connected to said plunger, said toggle system further including two toggle levers pivotally connected by a pin guided in said slot to be disposed in the straight portion thereof when the toggle system is in its dead center position and in the arcuate portion thereof during the opening and closing movements of said mold part.

9. The machine of claim 8, wherein the straight portion of said slot is sufficiently long that said plunger and said plate may continue movement even after the toggle system has attained the dead center position.

References Cited in the file of this patent
UNITED STATES PATENTS

| | | |
|---|---|---|
| 2,273,516 | Dinzl | Feb. 17, 1942 |
| 2,358,686 | Caron | Sept. 19, 1944 |
| 2,416,348 | Renier | Feb. 25, 1947 |